United States Patent
Dang

(10) Patent No.: US 7,216,300 B2
(45) Date of Patent: May 8, 2007

(54) METHOD AND APPARATUS FOR AN APPLET TO DISPLAY MULTIPLE WINDOWS

(75) Inventor: Nga T. Dang, San Diego, CA (US)

(73) Assignee: NCR Corp., Dayton, OH (US)

( * ) Notice: Subject to any disclaimer, the term of this patent is extended or adjusted under 35 U.S.C. 154(b) by 975 days.

(21) Appl. No.: 09/934,945

(22) Filed: Aug. 22, 2001

(65) Prior Publication Data

US 2002/0089536 A1 Jul. 11, 2002

Related U.S. Application Data

(62) Division of application No. 09/223,104, filed on Dec. 30, 1998, now abandoned.

(51) Int. Cl.
*G06F 9/40* (2006.01)
(52) U.S. Cl. ............... 715/783; 715/738; 715/749
(58) Field of Classification Search ............... 345/738, 345/749, 783; 715/738, 781–783, 748, 749, 715/803, 804, 806, 807
See application file for complete search history.

(56) References Cited

U.S. PATENT DOCUMENTS

| | | | |
|---|---|---|---|
| 5,465,362 A | 11/1995 | Orton et al. | |
| 5,469,540 A | 11/1995 | Powers, III et al. | |
| 5,499,334 A | 3/1996 | Staab | |
| 5,572,643 A | 11/1996 | Judson | |
| 5,706,502 A | 1/1998 | Foley et al. | |
| 5,742,768 A * | 4/1998 | Gennaro et al. | 709/203 |
| 5,754,830 A | 5/1998 | Butts et al. | |
| 5,790,855 A | 8/1998 | Faustini | |
| 5,802,530 A | 9/1998 | Hoff | |
| 5,861,883 A * | 1/1999 | Cuomo et al. | 345/733 |
| 5,922,044 A | 7/1999 | Banthia | |
| 5,935,249 A | 8/1999 | Stern et al. | |
| 5,943,496 A | 8/1999 | Li et al. | |
| 5,951,636 A | 9/1999 | Zerber | |
| 5,964,836 A | 10/1999 | Rowe et al. | |
| 6,006,241 A | 12/1999 | Purnaveja et al. | |
| 6,006,281 A | 12/1999 | Edmunds | |
| 6,011,916 A | 1/2000 | Moore et al. | |
| 6,012,068 A | 1/2000 | Boezeman et al. | |
| 6,014,702 A | 1/2000 | King et al. | |
| 6,018,343 A | 1/2000 | Wang et al. | |
| 6,035,332 A * | 3/2000 | Ingrassia et al. | 709/224 |
| 6,044,218 A | 3/2000 | Faustini | |
| 6,049,664 A | 4/2000 | Dale et al. | |

(Continued)

OTHER PUBLICATIONS

Begole et al., 1997, "Transparent Sharing of Java Applets: A Replicated Approach," ACM.

(Continued)

*Primary Examiner*—Ba Huynh
(74) *Attorney, Agent, or Firm*—Gates & Cooper

(57) ABSTRACT

A method, apparatus, and article of manufacture for displaying multiple window applets on a computer. The applet is written using the frame class and intercepts the methods by which an applet is started and started by the computer to allow more than one applet, or more than one applet window, to be open at any given time. By intelligently intercepting the start and stop methods, and tracking which applets are open, multiple applets can be open at any given time within the system.

21 Claims, 4 Drawing Sheets

U.S. PATENT DOCUMENTS

| | | |
|---|---|---|
| 6,052,711 A | 4/2000 | Gish |
| 6,067,558 A | 5/2000 | Wendt et al. |
| 6,070,177 A | 5/2000 | Kao et al. |
| 6,073,163 A | 6/2000 | Clark et al. |
| 6,104,334 A | 8/2000 | Allport |
| 6,108,687 A | 8/2000 | Craig |
| 6,125,363 A | 9/2000 | Buzzeo et al. |
| 6,157,933 A | 12/2000 | Celi, Jr. et al. |
| 6,175,877 B1* | 1/2001 | Zerber ........................ 719/310 |
| 6,177,936 B1* | 1/2001 | Cragun ........................ 345/760 |
| 6,401,134 B1* | 6/2002 | Razavi et al. ................ 719/310 |
| 6,412,021 B1* | 6/2002 | Nguyen et al. ............. 719/318 |
| 6,489,954 B1* | 12/2002 | Powlette ..................... 715/733 |
| 6,785,891 B1* | 8/2004 | Allen et al. ................. 719/313 |

OTHER PUBLICATIONS

Lee et al., 1996, "Supporting Multi-User, Multi-Applet Workspaces in CBE," ACM.

Chabert et al., 1998, "Java Object-Sharing in HABANERO," ACM.

Liang et al., 1998, "Dynamic Class Loading in the Java Virtual Machine," ACM.

* cited by examiner

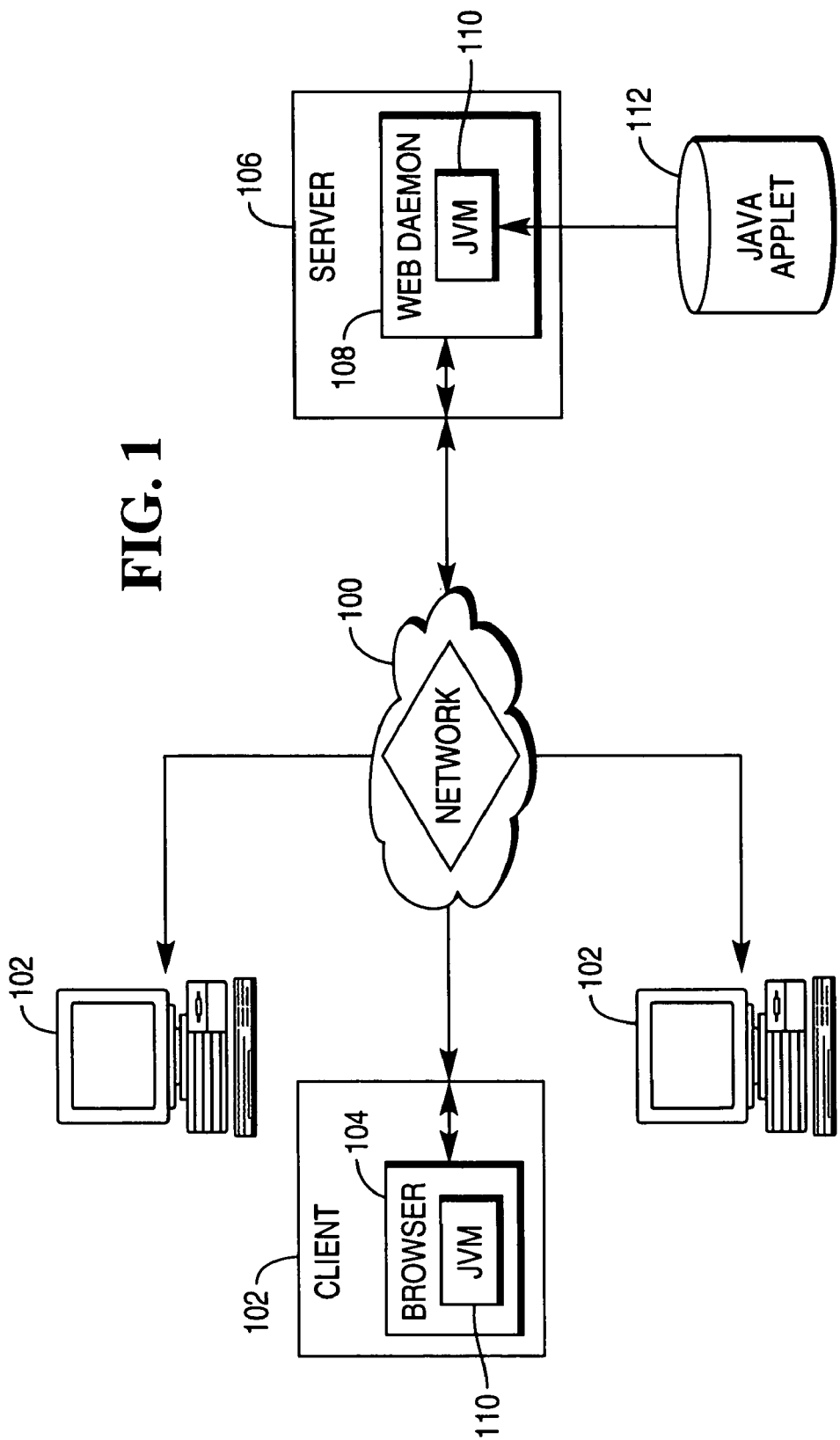

METHOD AND APPARATUS FOR AN APPLET TO DISPLAY MULTIPLE WINDOWS

This application is a Divisional of application Ser. No. 09/223,104, filed Dec. 30, 1998 now abandoned, entitled "METHOD FOR IMPLEMENTING A MULTIPLE WINDOW JAVA APPLET", which application is incorporated herein by reference.

BACKGROUND OF THE INVENTION

1. Field of the Invention

This invention relates in general to generating Web content, and in particular, to a method for implementing a multiple screen Java™ Applet for use with Web pages.

2. Description of Related Art

As the popularity and usefulness of the Internet grows, more developers are turning to Java™. Java™ is a popular computer language used to create platform-independent applications. Generally, Java™ applets are loaded into browsers from web pages to create text, graphics, or to perform some other useful function. Within the Java™ programming language, a developer can create applets or standalone applications. Applets are programs executed as part of a Web page and displayed within a Java™-enabled browser. Standalone applications, on the other hand, are general-purpose Java™ applications that don't need a browser to run, but require a Java™ Virtual Machine (JVM) on the computer where the standalone application is to be executed.

In the prior art, Java™ applets can only display a single page or window at a time. Generally, this is a restriction imposed by the browser or the browser's JVM. It can be seen then, that there is a need for a method for implementing applets that can display more than one page or window at a time.

SUMMARY OF THE INVENTION

To overcome the limitations in the prior art described above, and to overcome other limitations that will become apparent upon reading and understanding the present specification, the present invention discloses a method, apparatus, and article of manufacture for displaying multiple window applets on a computer. The applet is written using the frame class and intercepts the methods by which an applet is started and started by the computer to allow more than one applet, or more than one applet window, to be open at any given time. By intelligently intercepting the start and stop methods, and tracking which applets are open, multiple applets can be open at any given time within the system.

An object of the present invention is to provide a method for implementing a multiple screen Java™ applet. A further object of the present invention is to provide multiple open applets for simultaneous use on a computer system.

BRIEF DESCRIPTION OF THE DRAWINGS

Referring now to the drawings in which like reference numbers represent corresponding parts throughout:

FIG. 1 is a block diagram that illustrates an exemplary client-server hardware environment that could be used by the preferred embodiment of the present invention;

DETAILED DESCRIPTION OF THE PREFERRED EMBODIMENT

Figure 2A:
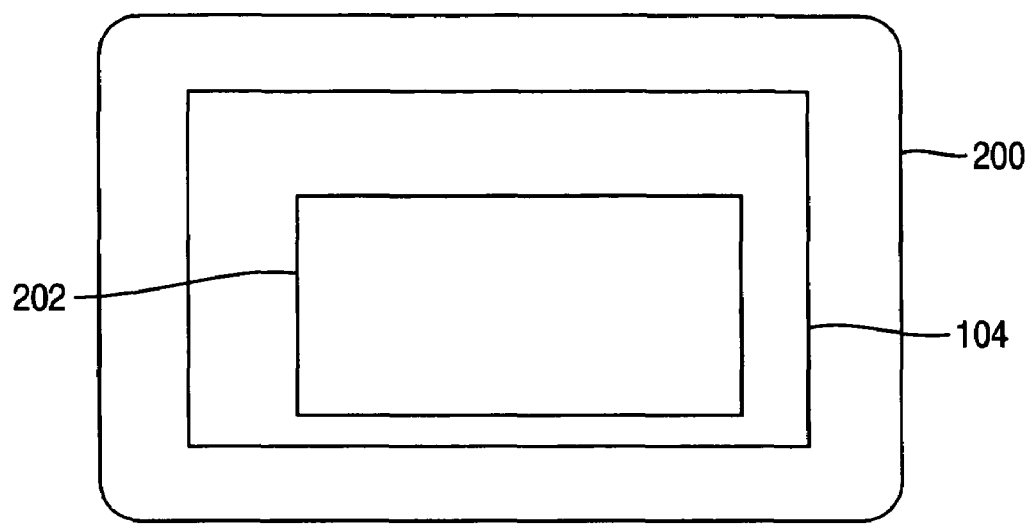
FIGS. 2A and 2B illustrate web pages that are opened in succession by a web browser.

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

When an Internet user retrieves web pages, they use a browser to transmit HyperText Transfer Protocol (HTTP) commands from their computer to a web daemon executed by a connected server computer. In turn, the web daemon responds with a HyperText Mark-up Language (HTML) (or other formatted) page that is transmitted to the browser for display to the user.

Within the Internet environment, the use of Java™ to create web pages and other web-based applications is widespread. Java™ is used because of its platform independence. Theoretically, a Java™ application can be executed by any client computer that has a JVM, regardless of that client computer's hardware or operating system type.

A number of high-level features of the Java™ computer language are used to support this platform independence. One such high-level feature is the Abstract Window Toolkit™ (AWT). The AWT is a Graphical User Interface (GUI) that offers a variety of tools for creating buttons, list boxes, etc., drawing two dimensional entities, creating text fonts and colors, scaling entities, etc. Further, the AWT handles events between users and computer systems such as keyboard entries, mouse clicks, etc. AWT provides a foundation for users to make applications and applets that are portable across platforms, which makes the applet or application have similar characteristics, also known as a "look and feel," on whatever platform a particular user is operating.

Applet Limitations

Many web browsers are designed to display only one applet window at a time, and thus, only one applet window can be active at any one time. Once the browser is commanded to switch to another web page or web site, the applet window will disappear, and the applet will cease executing. The present invention allows for multiple applet windows to be visible and active at any one time, and moreover, allows the applet to continue executing even when the browser's focus switches to another web page.

Applets in Specific Applications

It is desirable to have applets that display multiple windows, because it allows further flexibility for both web page designers and web page users. For example, an applet can monitor hardware and software resources from multiple physical locations, and can run continuously. At certain times, multiple windows can be open on a computer display for a user to monitor the status on one window, and respond to events that are occurring on another window. The requirement of multiple open windows is in conflict with the limitations of current web browsers, and is the focus of the present invention.

The limitations of the prior art are minimized by the present invention. The present invention implements an applet that intelligently responds to the open and close commands, e.g., the Init, Start, Stop, and Destroy methods implemented in the Java™ computer language, to allow for multiple windows to be open at any given time.

Hardware Environment

FIG. 1 schematically illustrates an exemplary hardware environment that could be used with the preferred embodiment of the present invention, and more particularly, illustrates a typical distributed computer system using the Internet 100 to connect client systems 102 executing Web browsers 104 to server systems 106 executing Web daemons 108. A typical combination of resources may include clients 102 that are personal computers or workstations, and servers 106 that are personal computers, workstations, minicomputers, or mainframes. These systems are coupled to one another over a network 100, which may include other networks such as intranets, extranets, LANs, WANs, etc., as well as the Internet.

Either or both of the Web browser 104 and Web daemon 108 may include a Java™ Virtual Machine (JVM) 110 that executes Java™ applets 112, objects, scripts, etc., associated with various Web content.

In general, the web browser 104, web daemons 108, JVM 110, and applet 112 each comprise data and/or instructions which, when read and executed by the server computer 106 or client computer 102, cause the computer 102 and/or 106 to perform the steps for implementing and/or using the present invention. Generally, the data and/or instructions are embodied in and/or readable from a device, carrier or media, such as memory, data storage devices, and/or remote devices coupled to the computer via a data communications device.

Thus, the present invention may be implemented as a method, apparatus, or article of manufacture using standard programming and/or engineering techniques to produce software, hardware, firmware, or any combination thereof. In addition, the term "article of manufacture" as used herein is intended to encompass logic and/or data embodied in or accessible from any device, carrier, or media.

However, the exemplary environment illustrated in FIG. 1 is not intended to limit the present invention. Indeed, other alternative hardware environments may be used without departing from the scope of the present invention.

Operation Of The Invention

Within the Java™ language, the AWT offers two classes that can create popup windows that appear outside the constraints of the normal browser 104 area allocated to an applet 112: Window and Frame.

The Window class is derived from the Container class so the Window class can contain other GUI components, also called widgets. Unlike applets 112, the Window class is not restricted to a pre-specified area of the screen within the browser 104. Window class objects can be resized, rendered not visible to the user until the "show( )" method is called, rendered invisible to the user when the "hide( )" method is invoked, and freed when the "dispose( )" method is invoked.

The Frame class extends the Window class by offering a title bar, a border for resizing objects, menus, and the ability to modify the cursor to various states when the frame or frame's components are in different states. For example, when a button is selected, or an operation is in progress, the cursor can change from an arrow to an hourglass, based on instructions contained within the Frame class. For most platforms, the title bar will tie control boxes, e.g., minimize, maximize, or close, to the computer system. The Frame class has all of the elements to make an applet look like a real application, complete with menu and system controls.

The present invention uses the Frame class to allow multiple window applets 112, offered within the Java™ AWT, to make the applet 112 "look and feel" like a Java™ application. Since Frame class objects can be displayed or closed at any time, be minimized or maximized, and displayed at multiple locations on the monitor, the use of the Frame class by the present invention allows multiple window Java™ applets 112 to be open simultaneously, and also allows multiple applets 112 to be open simultaneously.

Applet Availability

Figure 2B:
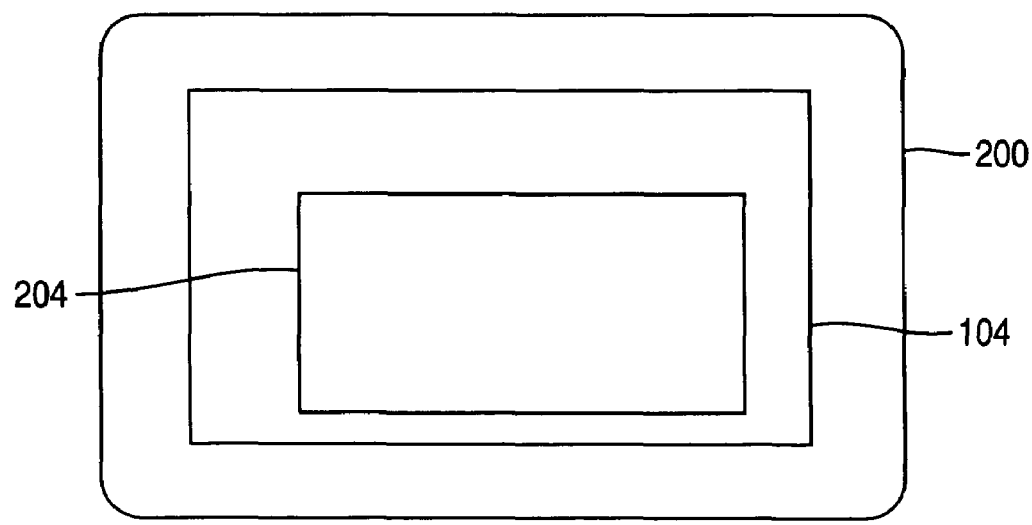

FIGS. 2A and 2B illustrate web pages that are opened in succession by a web browser 104. In FIG. 2A, web browser 104 executes an applet 112 to display the window 202 on monitor 200 of client 102. The applet 112 window 202 display, i.e., what is shown on monitor 200, is controlled within the web browser 104. In FIG. 2B, the web browser 104 is commanded by the user to switch to another web site. As shown in FIG. 2B, web browser 104 now executes another applet 112, which displays another window 204, and window 202 is replaced by the new window 204 on monitor 200.

Figure 3:
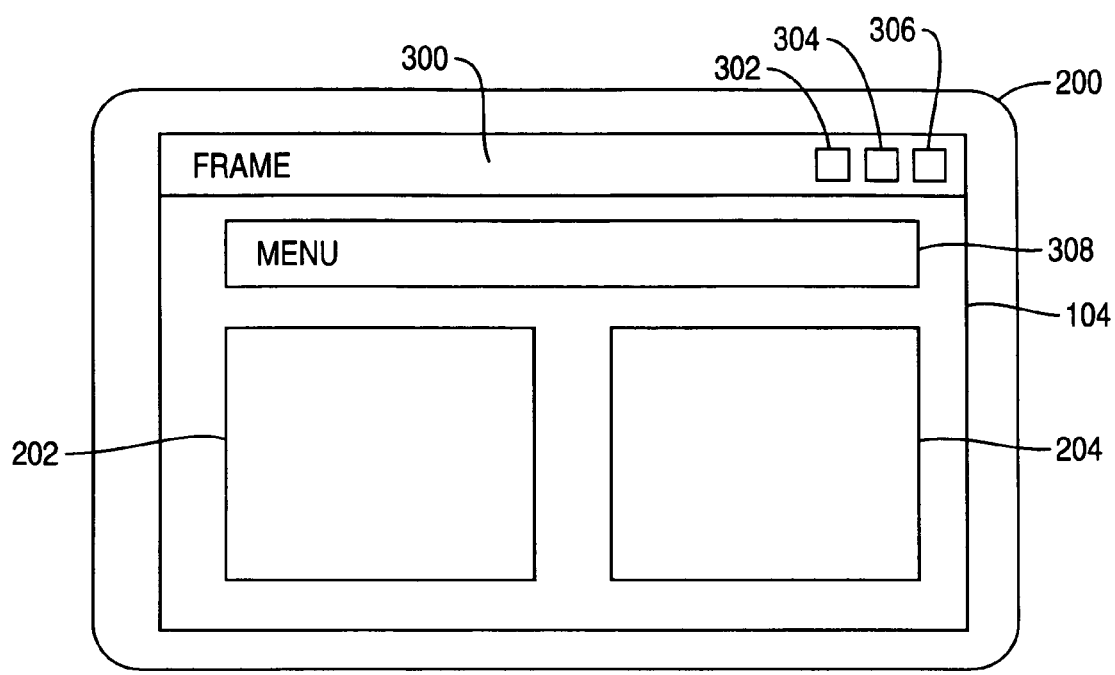
FIG. 3 illustrates a multiple page applet on a computer monitor as embodied in the present invention.

FIG. 3 illustrates a multiple window applet on a computer monitor as embodied in the present invention.

By using the frame 300 to display windows 202 and 204, both windows 202 and 204 executed by the applet 112 can be open at the same time in the frame 300. Frame 300 contains additional items, such as minimize window box 302, restore window box 304, and close window box 306, which allow the user to size the frame 300 as desired. Further, frame 300 can contain menu 308 to allow the user to manipulate frame 300 and/or windows 202 and 204 as desired.

The use of the frame 300 allows multiple windows 202 and 204 to be open simultaneously. Frame 300 must account for additional items associated with windows 202 and 204, namely when to open and close windows 202 and 204.

Figure 4:
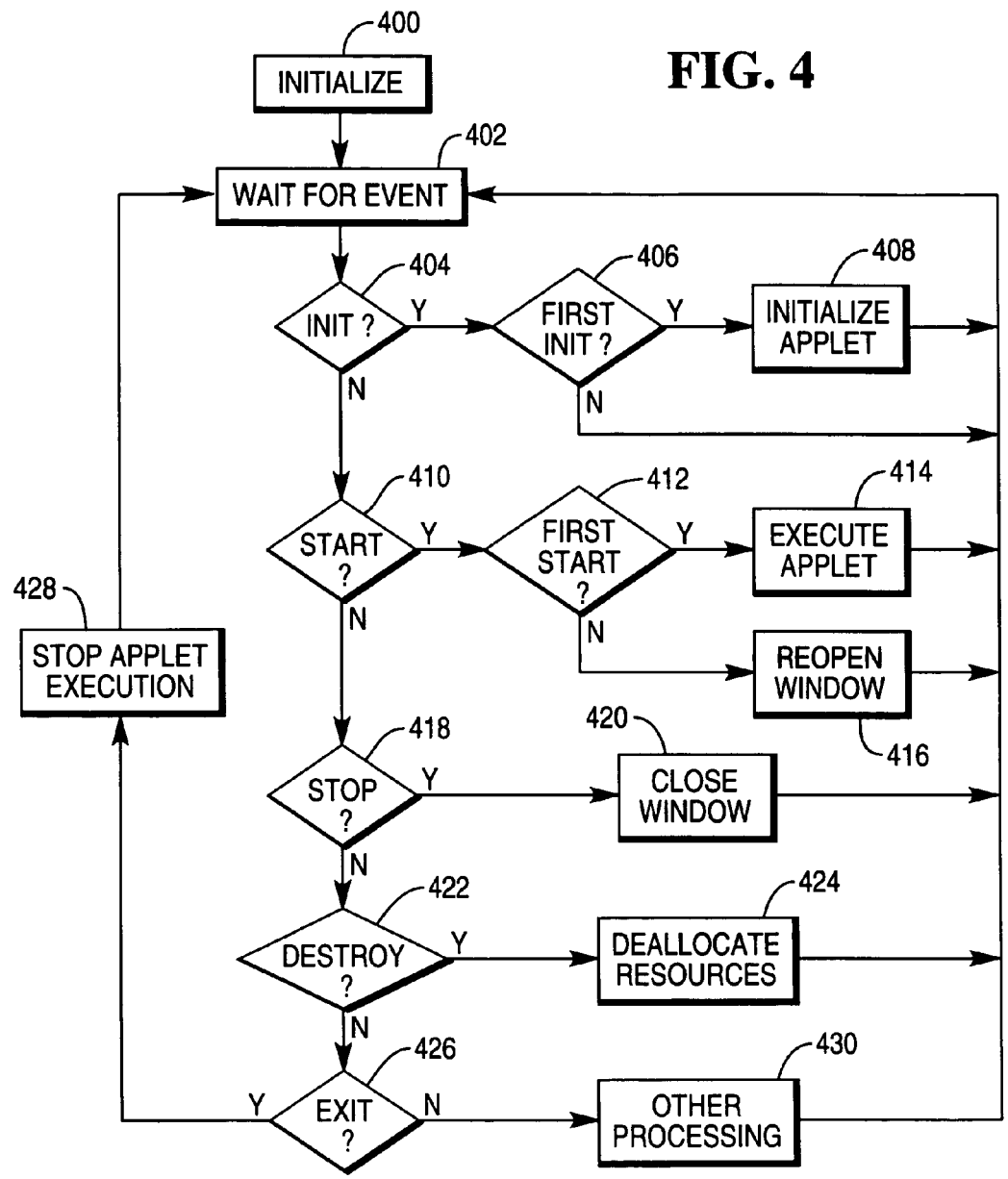
FIG. 4 is a flowchart illustrating how the present invention controls various operations associated with applets.

FIG. 4 is a flowchart illustrating how the present invention controls various operations associated with applets 112.

To develop windows 202 and 204 pages that have pages displayed outside of the web browser's 104 control as in the present invention, the problem of when to stop the applet 112 and close windows 202 and 204 becomes a concern. There are four methods that the web browser 104 uses to interact with applets 112: Init, Start, Stop, and Destroy.

The Init method is called by the browser 104 to load and initialize applet 112 into the system. Init is always called before the first time the Start method is called.

The Start method is called by the browser 104 to inform the applet 112 that applet 202 should start execution. Start is called after the Init method and each time the applet 202 is revisited in a web page. A subclass of applet 112 should override this method if it has any operation that it wants to perform each time the web page containing the applet 112 is visited.

The Stop method is called by the browser 104 to inform applet 112 that applet 112 should stop execution. Stop is called when the web page containing applet 112 has been replaced by another applet 112 window or page, and also just before the applet 112 is to be destroyed. A subclass of applet 112 should override this method if it has any operation that it wants to perform each time the web page containing the applet 112 is no longer visible on monitor 200.

The Destroy method is called by the browser 104 to inform the applet 112 that applet 112 is being reclaimed and that it should destroy any resources that it has allocated. The stop method will always be called before the destroy method. A subclass of applet 112 should override this method if it has any operation that it wants to perform before it is destroyed.

FIG. 4 is a flow chart that illustrates the logic performed by an applet 112 according to the preferred embodiment of the present invention. Block 400 illustrates the applet 112 being initialized. Block 402 illustrates applet 112 waiting for an event, e.g., the sending of a message indicating one of the methods to be performed by the applet 112, or some other processing method to be performed.

Once an event is received, control passes to decision block 404, where applet 112 determines if the event is an init method request. If so, control passes to decision block 406, where the applet 112 determines if the init is a "first init," e.g., the applet 112 has not already been loaded and started by client 102 or web server 106. This can be determined by checking to see if any windows or frames 300 associated with the applet 112 are opened, or by other methods. If applet 112 determines that this is a first init, e.g., the first time that the applet 142 has been opened for this computing session, then control passes to block 408, where the applet 202 is initialized If applet 112 determines that applet 112 has already been opened in this computing session, then the init command received in block 404 is not a "first init," and applet 112, via frame 300, knows not to reinitialize applet 112. Instead, control passes from block 406 back to block 402.

If the event received in block 402 was not an init request, control passes from block 404 to decision block 410, where applet 112 determines if the event was a start request. If so, control passes to decision block 412, where the applet 112 determines if the start is a "first start," e.g., the applet 112 has not already been loaded and started by client 102 or web server 106. This can be determined by checking to see if any windows or frames 300 associated with the applet 112 are opened, or by other methods. If applet 112 determines that this is a first start, e.g., the first time that the applet 112 has been opened for this computing session, then control passes to block 414, where the applet 112 is executed by client 102 or web server 106.

If applet 112 determines that applet 112 has already been started in this computing session, then the start command received in block 412 is not a "first start," and control passes to block 416, where the applet 112 merely reopens a previously opened window 202 or 204 of applet 112. Regardless of whether control passed to block 414 or 416, control returns to block 402 to wait for another event.

If the event received in block 402 was not an init or a start request, control passes from block 410 to decision block 418, where applet 112 determines if the event was a stop request. If so, control passes to block 420, where the applet closes the window 202 or 204 associated with applet 112. Control then passes back to block 402 to wait for another event.

If the event received in block 402 was not an init, start, or stop request, control passes from block 418 to decision block 424, where applet 112 determines if the event was a destroy request. If applet 112 determines that this is a destroy, e.g., that applet 112 is to be stopped and resources deallocated, then control passes to block 424, where the applet 112 deallocates the resources used by applet 112. Control then passes to block 402 to wait for another event.

If the event received in block 402 was not an init, start, stop, or destroy request, control passes from block 422 to decision block 426, where applet 112 determines if the event was an exit request. This tells the applet 112 that the user really wants to stop execution of applet 112, even if the user wants to continue to access the web. If the request is an exit request, control passes to block 428, where the applet execution is stopped. Although not required by the logic, the user has the option of closing and deallocating the applet 112 to free up resources to be used for other processing and displaying resources if desired.

If applet 112 determines that the event is not an exit command, control passes to block 430 for other processing. Regardless of whether control passed to block 428 or 430, control returns to block 402 to wait for another event.

There are other logical methods to control the opening and closing of applet 112 windows 202 on the monitor 200. Depending on application requirements, the user can program applet 202 to close all windows 202 and stop applet 112 execution when the web browser 104 switches to a new applet 112 e.g., a different web site, but to continue display of the main window 202 of applet 112 and allow execution of extra screens of applet 112 from whatever applet 112 is active.

Alternatively, the applet can close the active frames 300 of applet 112 when the web browser 104 switches the web site, and reopen when the applet 112 is revisited. The applet 112 keeps track of whether it is open or not, and responds to init and start methods as described in FIG. 4.

Another way to program applets 112, as described in FIG. 4, is to allow the applet 112 to leave all frames open, and applet 112 will continue to run even when the user executes another applet 112. An additional command, e.g., the exit command, is provided to stop (and, if desired destroy) active applet 112 only when the exit command is received.

CONCLUSION

This concludes the description of the preferred embodiment of the invention. The following describes some alternative embodiments for accomplishing the present invention. For example, any type of computer, such as a mainframe, minicomputer, or personal computer, could be used to implement the present invention. In addition, the present invention is not limited by specific document or programming languages, and could comprise languages other than XML and Java™. For example, the present invention could also be used with HTML, SGML, NetRexx, VisualBasic Script, XML, Perl, C, C++, Cobol, etc.

In summary, the present invention discloses a method, apparatus, and article of manufacture for displaying multiple window applets on a computer. The applet is written using the frame class and intercepts the methods by which an applet is started and started by the computer to allow more than one applet, or more than one applet window, to be open at any given time. By intelligently intercepting the start and stop methods, and tracking which applets are open, multiple applets can be open at any given time within the system.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for displaying multiple windows comprising:

a browser application on a computer executing an applet;
the applet displaying a first window outside of the browser application's window constraints using a class, wherein the class comprises elements that make a window displayed by the applet look like an executing application;

the applet displaying a second window outside of the browser application's window constraints simultaneously with the first window using the class; and the method further comprising maintaining a list of displayed windows, closing the displayed windows in the list when the browser switches to a new web site, and reopening the displayed windows in the list of displayed windows when the browser executes the applet again.

2. The method of claim 1 wherein the class is a FRAME class provided by an abstract windows toolkit™ (AWT).

3. The method of claim 1 wherein the class elements provide for displaying a title bar, a border for resizing objects, menus, an ability to modify a cursor to various states, and system commands.

4. The method of claim 1 further comprising closing all displayed windows and halting execution of the applet when the browser switches to a new web site.

5. The method of claim 1 further comprising:
leaving displayed windows open after the browser switches to a new web site;
providing an exit command; and
closing the displayed windows upon receiving the exit command.

6. The method of claim 1 wherein the first window is used to monitor a status of a resource and the second window is used to respond to an event occurring with the monitored resource.

7. The method of claim 6 wherein the applet is monitoring hardware and software resources from multiple physical locations.

8. A system for displaying multiple windows comprising:
a computer;
a browser application executing on the computer, wherein the browser application comprises window constraints;
an applet, executed by the browser application, wherein the applet is configured to:
display a first window outside of the browser application's window constraints using a class, wherein the class comprises elements that make a window displayed by the applet look like an executing application; and
display a second window outside of the browser application's window constraints simultaneously with the first window using the class; and
the browser configured to maintain a list of displayed windows, close the displayed windows in the list when the browser switches to a new web site, and reopen the displayed windows in the list of displayed windows when the browser executes the applet again.

9. The system of claim 8 wherein the class is a FRAME class provided by an abstract windows toolkit™ (AWT).

10. The system of claim 8 wherein the class elements provide for the browser to display a title bar, a border for resizing objects, menus, an ability to modify a cursor to various states, and system commands.

11. The system of claim 8 wherein the browswer is configured to:
request a new web site; and
close all displayed windows and halt execution of the applet when the browser switches to a new web site.

12. The system of claim 8 wherein the browser is configured to:
leave displayed windows open after the browser switches to a new web site;
provide an exit command; and
close the displayed windows upon receiving the exit command.

13. The system of claim 8 wherein the first window is used to monitor a status of a resource and the second window is used to respond to an event occurring with the monitored resource.

14. The system of claim 13 wherein the applet is further configured to monitor hardware and software resources from multiple physical locations.

15. An article of manufacture comprising a computer program carrier readable by a computer and storing one or more instructions executable by the computer to perform a method for displaying multiple windows, the method comprising:
a browser application on a computer executing an applet;
the applet displaying a first window outside of the browser application's window constraints using a class, wherein the class comprises elements that make a window displayed by the applet look like an executing application;
the applet displaying a second window outside of the browser application's window constraints simultaneously with the first window using the class; and
the method further comprising maintaining a list of displayed windows, closing the displayed windows in the list when the browser switches to a new web site, and reopening the displayed windows in the list of displayed windows when the browser executes the applet again.

16. The article of manufacture of claim 15 wherein the class is a FRAME class provided by an abstract windows toolkit™ (AWT).

17. The article of manufacture of claim 15 wherein the class elements provide for displaying a title bar, a border for resizing objects, menus, an ability to modify a cursor to various states, and system commands.

18. The article of manufacture of claim 15, the method further comprising closing all displayed windows and halting execution of the applet when the browser switches to a new web site.

19. The article of manufacture of claim 15, the method further comprising:
leaving displayed windows open after the browser switches to a new web site;
providing an exit command; and
closing the displayed windows upon receiving the exit command.

20. The article of manufacture of claim 15 wherein the first window is used to monitor a status of a resource and the second window is used to respond to an event occurring with the monitored resource.

21. The article of manufacture of claim 20 wherein the applet is monitoring hardware and software resources from multiple physical locations.

* * * * *